United States Patent
Matsushita

(10) Patent No.: US 6,863,463 B2
(45) Date of Patent: Mar. 8, 2005

(54) LEVER-TYPE CONNECTOR AND CONNECTOR ASSEMBLY

(75) Inventor: Yasuo Matsushita, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 23 days.

(21) Appl. No.: 10/397,557

(22) Filed: Mar. 25, 2003

(65) Prior Publication Data
US 2003/0177620 A1 Sep. 25, 2003

(30) Foreign Application Priority Data
Mar. 25, 2002 (JP) ......................................... 2002-083438

(51) Int. Cl.⁷ .......................................... H01R 13/629
(52) U.S. Cl. ................................. 403/322.4; 439/157
(58) Field of Search ................................. 439/157, 152, 439/153, 155, 160, 372; 403/321, 322.4

(56) References Cited

U.S. PATENT DOCUMENTS

| | | | |
|---|---|---|---|
| 5,476,390 A | | 12/1995 | Taguchi et al. |
| 5,482,394 A | | 1/1996 | Shinchi et al. |
| 5,628,642 A | * | 5/1997 | Bieringer et al. ........... 439/157 |
| 5,957,710 A | * | 9/1999 | Nagano ........................ 439/157 |
| 6,488,516 B2 | * | 12/2002 | Osawa et al. ................ 439/157 |
| 6,602,082 B2 | * | 8/2003 | Nishide et al. .............. 439/157 |
| 6,623,286 B2 | * | 9/2003 | Tachi ........................... 439/157 |
| 6,644,992 B2 | * | 11/2003 | Maegawa .................... 439/157 |
| 6,655,971 B2 | * | 12/2003 | Maegawa .................... 439/157 |

FOREIGN PATENT DOCUMENTS

JP        6-275360        9/1994

* cited by examiner

Primary Examiner—James R. Brittain
(74) Attorney, Agent, or Firm—Gerald E. Hespos; Anthony J. Casella

(57) ABSTRACT

A connector (A) has a housing (10), and a lock (15) is formed on the housing (20). A lever (20) is mounted on the housing (10) for rotation between an initial position (FIGS. 2; 3; 5) and a connection position (FIG. 4). The lever (20) has a resilient latch (25) for releasably engaging the lock (15) when the lever (20) is at the initial position. The lock (15) and the resilient latch (25) engage in a direction substantially parallel with a projecting direction (PD) of the resilient latch (25). Thus, there is no possibility that the resilient latch (25) will deform sideways, and the lever (20) can be securely held at the initial position.

13 Claims, 7 Drawing Sheets

LEVER-TYPE CONNECTOR AND CONNECTOR ASSEMBLY

BACKGROUND OF THE INVENTION

1. Field of the Invention

The invention relates to a lever-type connector.

2. Description of the Related Art

A lever-type connector has a housing and a lever rotatably mounted on the housing. The lever can be rotated from an initial position where the lever-type connector begins mating with a mating connector to a final position where the lever-type connector is fully connected with the mating connector. Operation efficiency is improved by releasably holding the lever at an initial position while the lever-type connector is transported to a location where the lever-type connector is connected with the mating connector.

Japanese Unexamined Patent Publication No. 6-275360 discloses a lever-type connector with a torsion coil spring in the housing. One lock arm extends from a coiled portion of the torsion spring and engages the housing and another lock arm engages a retainer. The lever is held temporarily at the initial position by the resilient force of the coiled portion. However, the use of the torsion coil spring increases the number of required parts.

The present invention was developed in view of these inefficiencies, and an object of the invention is to reduce the number of parts in a lever-type connector.

SUMMARY OF THE INVENTION

The invention relates to a lever-type connector that is connectable with a mating connector. The lever-type connector includes a housing and a lever is supported on the housing for rotation between an initial position and a connection position. A holding means is provided for holding the lever at the initial position. The lever has a cam that engages a mating cam of the mating connector by lightly fitting the mating connector into the housing with the lever held at the initial position. The lever then is rotated toward the connection position and develops a cam action between the cam and the mating cam. The cam action pulls the mating connector into the housing. The holding means comprises at least one lock and at least one resilient latch. The resilient latch has an unbiased rotation preventing position where the resilient latch engages the lock to hold the lever at the initial position. However, the resilient latch can be biased to a rotation permitting position where the latch is disengaged from the lock to permit the lever to rotate toward the connection position. The lock and the resilient latch are engaged in a direction substantially parallel (e.g. between about −20° and about 20°) with a projecting direction of the latch.

The lock and the resilient latch are formed on the existing parts, i.e. the housing and the lever. Thus, no separate part is necessary to hold the lever at the initial position. The resilient latch could be deformed sideways if the lock was engaged with the resilient latch in a direction substantially normal to the projecting direction of the resilient latch, and in this situation, the lever could move loosely from the initial position. However, the lock of the present invention engages the resilient latch in a direction substantially parallel with the projecting direction of the resilient latch. Thus, there is no possibility that the resilient latch will deform sideways, and the lever can be held securely at the initial position without moving loosely or shaking.

The resilient latch preferably is on the lever and is cantilevered.

The cam preferably comprises a cam groove in the lever and the mating cam preferably comprises a cam pin on the mating connector.

The housing preferably has a receptacle into which the mating connector fits, and the lock is at or near the opening edge of the receptacle.

The lock is formed using a part of the existing shape of the housing. Thus, it is not necessary to provide a specially shaped part, such as a notch or a recess as the lock and, therefore, the shape of the housing is simple.

The lever preferably has two arms are coupled by an operable portion. The resilient latch is at a position on the arm displaced from the center of rotation of the lever toward the operable portion.

Ends of the arms opposite the operable portion are easily deformable away from one another. The reliability of the locking function by the resilient latch may be reduced if the resilient latch is at this easily deformable position. However, the resilient latch is at a position on the arm coupled by the operable portion and is not affected by a widening deformation. Thus, the resilient latch will not disengage from the lock as due to a widening deformation of the arms and, the lever can be held at the initial position with high reliability.

Two resilient latches and two locks may be provided on substantially opposite positions on the lever and the housing, respectively.

The resilient latch preferably comprises a locking projection with a locking surface aligned substantially parallel to the axis of rotation of the lever.

An excessive deformation-preventing portion may be provided to prevent excessive deformation of the resilient latch away from the lock.

Most preferably, the projecting direction of the resilient latch intersects a direction of rotation of the lever.

The invention also relates to a lever-type connector assembly comprising the above-described lever-type connector and a mating connector.

The mating connector preferably has a disengaging portion for contacting the resilient latch and disengaging the resilient latch from the lock as the mating connector is fit lightly into the housing. The lever then is permitted to rotate from the initial position toward the connection position. Thus, an extra operation of disengaging the resilient latch and the lock is unnecessary.

The housing preferably has a disengagement-portion insertion groove for receiving the disengaging portion.

These and other features of the invention will be more apparent upon reading the following detailed description and accompanying drawings. It should be understood that even though embodiments are described separately, single features thereof may be combined to additional embodiments.

DETAILED DESCRIPTION OF THE PREFERRED EMBODIMENTS

Figure 1:
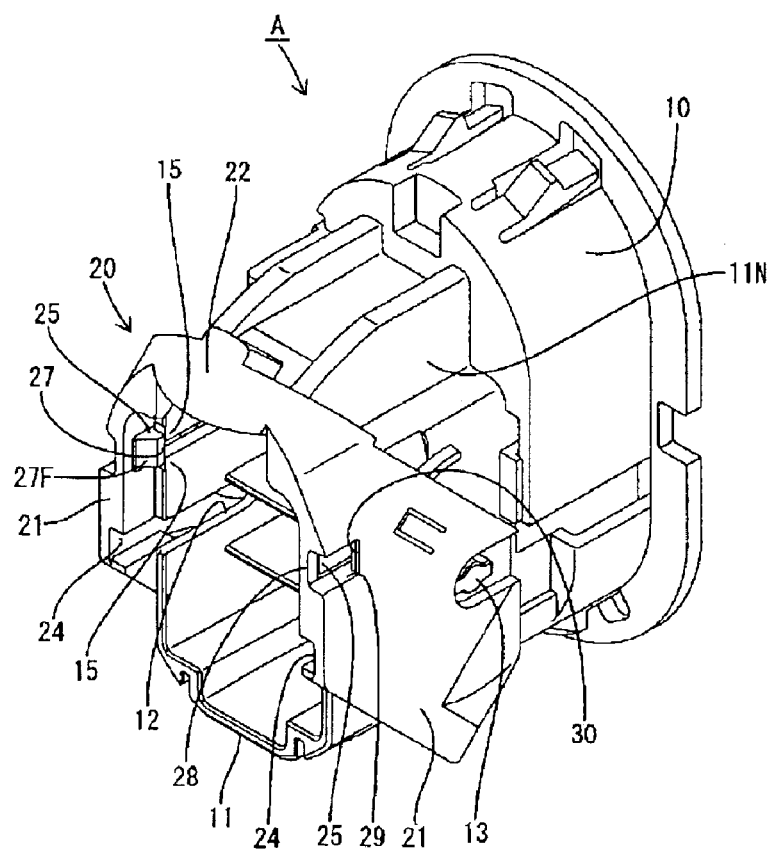
FIG. 1 is a perspective view of one embodiment of the invention.

A lever-type connector assembly according to the invention includes first and second connectors A and B, as shown in FIGS. 1 to 7. The first connector A has a housing 10 made e.g. of a synthetic resin and male terminal fittings (not shown) are accommodated in the housing 10. A vertically long receptacle 11 projects forward on the housing 10 and is configured to receive the second connector B. Cam-pin insertion grooves 12 are formed in left and right walls of the receptacle 11 and extend substantially straight back along a fitting direction FD of the connectors A, B from the opening edge toward the back of the receptacle 11. A supporting shaft 13 projects out slightly behind the rear ends of the cam-pin insertion grooves 12. Disengaging-portion insertion grooves 14 also are formed in the left and right walls of the receptacle 11 and extend back from the opening edge of the receptacle 11 parallel to but above the cam-pin insertion grooves 12. Locks 15 are formed adjacent the opening edge of the receptacle 11 at the upper and lower sides of the entrances of the disengaging-portion insertion grooves 14, and a receiving surface 15S is formed at the front of each lock 15.

The first connector A also includes a substantially U-shaped lever 20 made e.g. of a synthetic resin. The lever 20 includes left and right plate-shaped arms 21 and an operable portion 22 that couples upper ends of the arms 21. Each arm 21 has a bearing hole 23 slightly below the vertical center of the arm 21 and close to the rear edge thereof. The bearing holes 23 engage the supporting shafts 13 so that the arms 21 are adjacent the outer surfaces of the sidewalls of the receptacle 11. Thus, the lever 20 is supported on the housing 10 for rotation between an initial position (see FIGS. 2, 3 and 5) and a connection position (see FIG. 4). The inner surface of each arm 21 is recessed to form a cam groove 24 with a substantially straight entrance that extends to the front edge of the arm 21.

Each arm 21 has a resilient latch 25 displaced from the bearing hole 23 toward the operable portion 22 and close to the front edge of the arm 21. The resilient latch 25 is surrounded by a U-shaped slit 26 that penetrates the arm 21 from the inner surface to the outer surface, and hence each resilient latch 25 defines a cantilever that projects toward the front edge of the arm 21. The resilient latch 25 is deformable outwardly with its base end as a supporting point. Further, a locking projection 27 projects in from the inner surface of the free end of each resilient latch 25 and faces the corresponding side wall of the receptacle 11. A slanted guide surface 27F is defined at the front end of each locking projection 27 and is aligned oblique to a projecting direction PD of the resilient latch 25. A locking surface 27R is defined at the rear of the locking projection 27 and extends substantially normal to the projecting direction PD of the resilient latch 25. Thus, the locking surface 27R is substantially parallel with the axis of rotation of the lever 20 and intersects the rotating direction RD of the lever 20. Vertical dimensions of the resilient latches 25, i.e. the width of the locking surfaces 27R, are larger than the width of the disengaging-portion insertion grooves 14 of the receptacle 11.

The slit 26 that forms the resilient latch 25 does not open in the front edge of the arm 21. Rather, a reinforcement 28 couples areas of the front end of the arm 21 above and below the resilient latch 25. The reinforcements 28 substantially prevent inadvertent deformation of the resilient latch 25. The inner surface of the resilient latch 25 is substantially flush with the inner surface of the arm 21. However, the outer surface of the resilient latch 25 is recessed in from the outer surface of the arm 21 to define a deformation space 29 for the resilient latch 25. An excessive deformation-preventing portion 30 extends forward in the deformation space 29. The excessive deformation-preventing portion 30 is substantially flush with the outer surface of the arm 21 and surrounds the rear end of the resilient latch 25 (see FIG. 6). The outer surface of the resilient latch 25 contacts the front edge of the excessive deformation-preventing portion 30 to prevent any further deformation of the resilient latch 25. Thus, the resilient latch 25 will not deform beyond its resiliency limit. The resilient latch 25 is accommodated substantially completely in the deformation space 29 without projecting from the outer surface of the arm 21 (see FIG. 7).

The second connector B includes a main body 40 and female terminal fittings (not shown) are accommodated in the main body 40. Two cylindrical cam pins 41 project from the outer left and right surfaces of the second connector B. Disengaging projections 42 are formed on the outer left and right surfaces of the second connector B above and behind the cam pins 41. Each disengaging portion 42 is narrow and long in forward and backward directions substantially parallel with the fitting direction FD into the receptacle 11 and has a substantially trapezoidal plan view. A slanted connection guide surface 42F is formed at the front of each disengaging portion 42 and is aligned oblique to the fitting direction FD into the receptacle 11. Similarly, a slanted guide surface 42R is formed at the rear of each disengaging portion 42 and is aligned oblique to a withdrawing direction from the receptacle 11. A vertical dimension of the disengaging portions 42 is equal to or slightly narrower than the disengaging-portion insertion grooves 14 of the receptacle 11.

Figure 2:
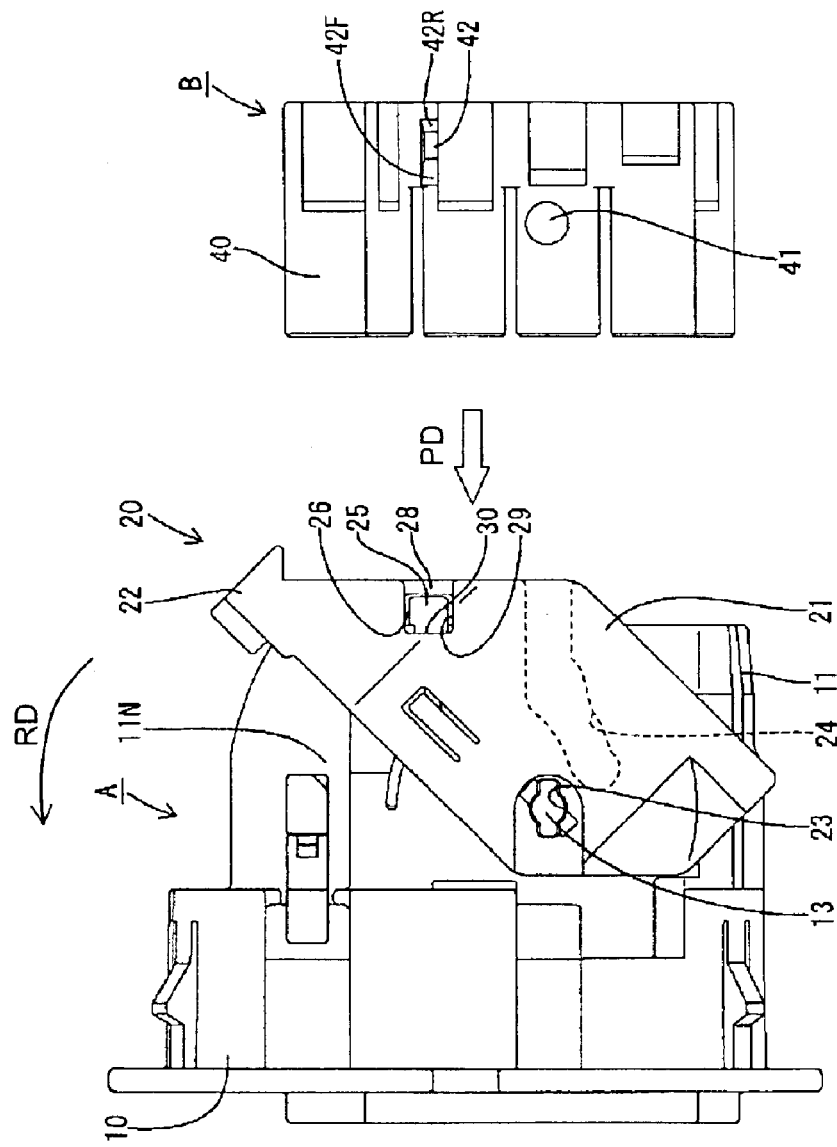
FIG. 2 is a side view showing a lever held at an initial position.
Figure 3:
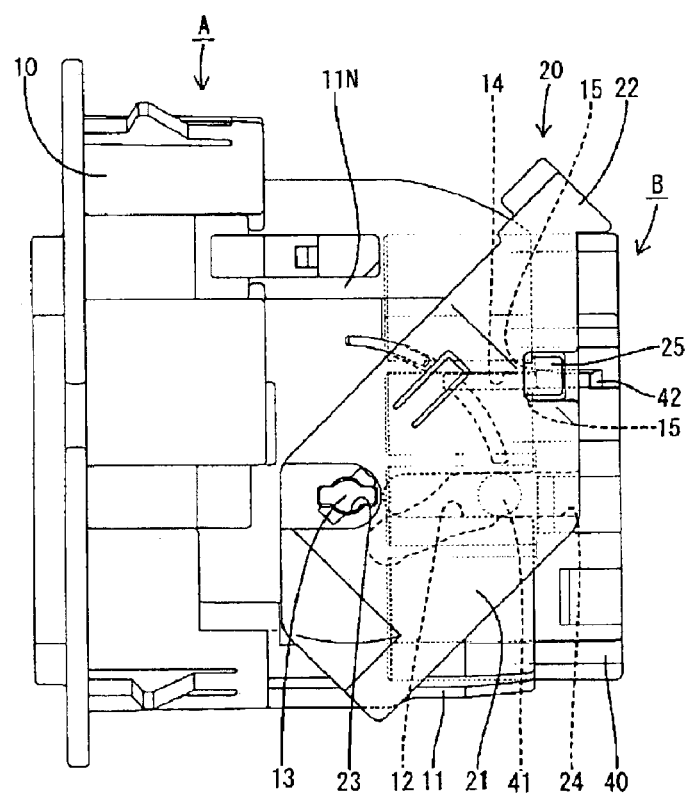
FIG. 3 is a side view showing a second connector lightly fitted into a housing.
Figure 4:
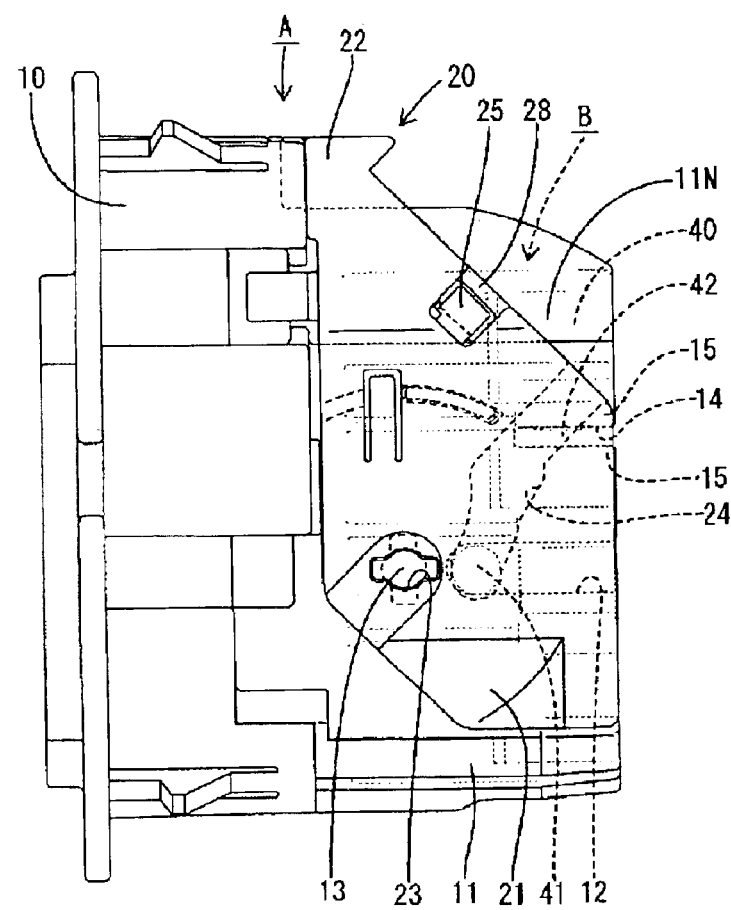
FIG. 4 is a side view showing the two housings connected.
Figure 5:
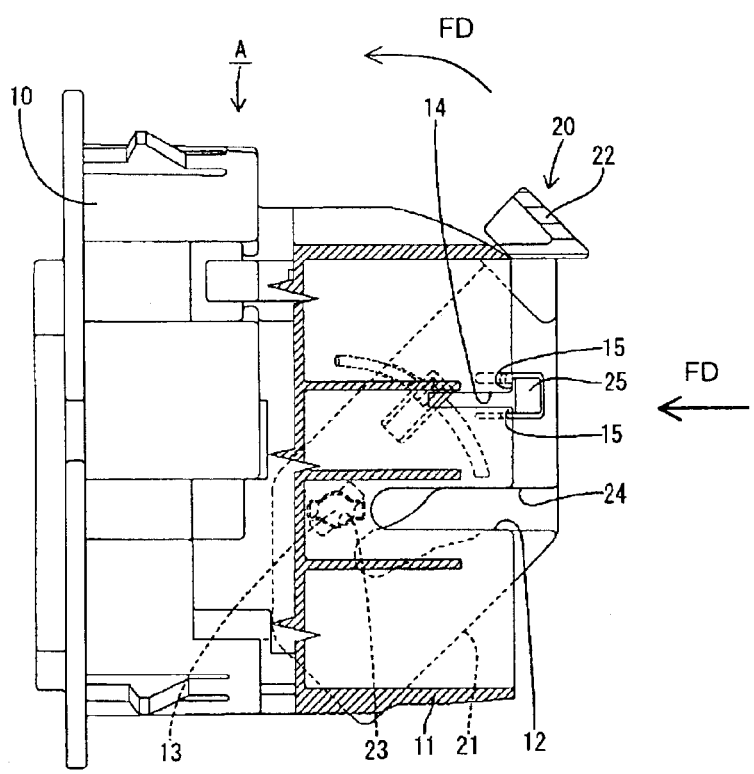
FIG. 5 is a vertical section showing the lever at the initial position.
Figure 6A:
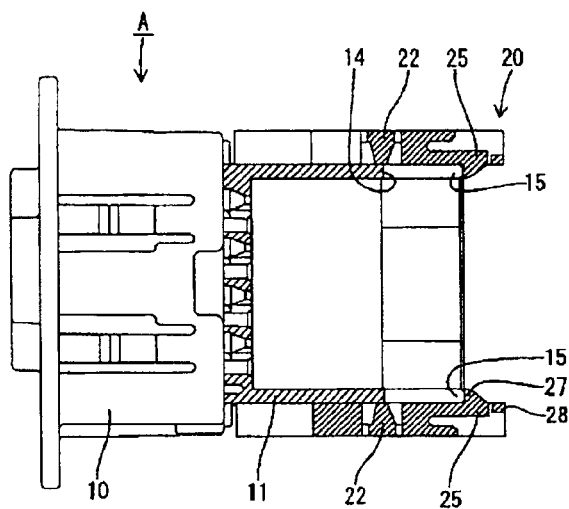
FIGS. 6(a) and 6(b) are a horizontal section and a partial enlarged view showing a state where the lever is held at the initial position.
Figure 6B:
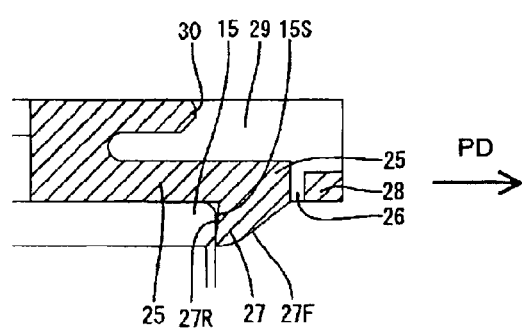
Figure 7A:
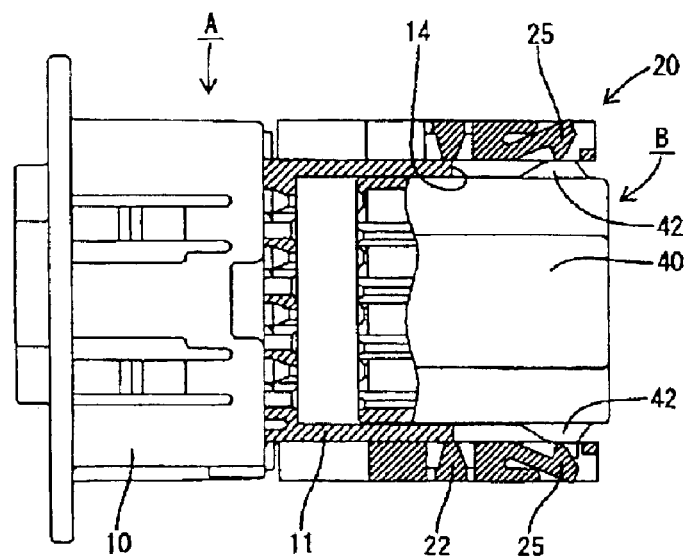
FIGS. 7(a) and 7(b) are a horizontal section and a partial enlarged view showing the second connector lightly fit into the housing.
Figure 7B:
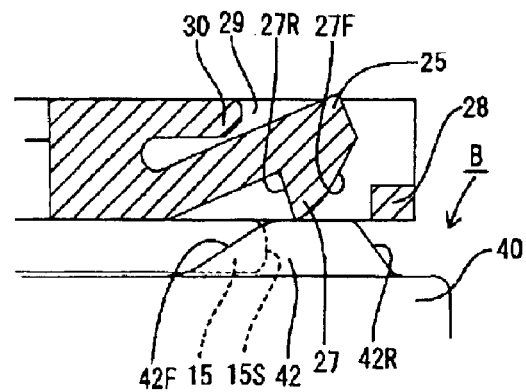

The connector is used by placing the lever 20 at the initial position on the housing 10. Thus, the entrances of the cam grooves 24 face forward and align with the cam-pin insertion grooves 12, as shown in FIGS. 2 and 5. As a result, the cam pins 41 can be inserted into the cam grooves 24. The locking surfaces 27R of the resilient latches 25 engage the receiving surfaces 15S of the locks 15 of the receptacle 11 from the front (see FIG. 6). This locking is effected in a direction substantially parallel with the projecting direction PD of the resilient latches 25 and intersecting a rotating direction RD of the lever 20 from the initial position to the connection position. The engagement of the resilient latches 25 and the locks 15 prevents the lever 20 from rotating toward the connection position and holds the lever 20 at the initial position.

The second connector B is fit lightly into the receptacle 11 in this state. As a result, the cam pins 41 enter both the cam-pin insertion grooves 12 and the entrances of the cam grooves 24. Additionally, the disengaging portions 42 enter the disengaging-portion insertion grooves 14. The guide surfaces 42F of the disengaging portions 42 slide in contact with the guide surfaces 27F of the locking projections 27 on the resilient latches 25. Thus, the resilient latches 25 deform outwardly and disengage from the locks 15 (see FIG. 7). Consequently, the resilient latches 25 are freed from the locks 15 and the lever 20 can be rotated toward the connection position. The rotation of the lever 20 generates a cam action between the cam grooves 24 and the cam pins 41 and pulls the second connector B into the receptacle 11. Thus, the connectors A, B are connected properly by the rotation of the lever 20. The locking projections 27 of the resilient latches 25 slide on the outer surfaces of the left and right walls of the receptacle 11 in the process of rotating the lever 20 and the resilient latches 25 remain deformed. The locking projections 27 face narrow portions 11 N at the upper ends of the left and right walls of the receptacle 11 when the lever 20 reaches the connection position shown in FIG. 4, and the two connectors A, B are connected properly. Thus, the latches 25 return resiliently inward to their unbiased states.

The lever 20 is rotated from the connection position to the initial position to withdraw the second connector B. Thus, the entrances of the cam grooves 24 extend substantially forward and align with the cam-pin insertion grooves 12. The resilient latches 25 engage the locks 15 to hold the lever 20 at the initial position. At this time, the disengaging portions 42 of the second connector B are behind the locking projections 27 of the resilient latches 25. The second connector B then may be withdrawn from the receptacle 11 with the lever 20 held at the initial position. The guide surfaces 42R for withdrawal of the disengaging portions 42 contact the locking projections 27 in the process of withdrawing the second connector B, and the resilient latches 25 deform out of moving paths of the disengaging portions 42 while the locking projections 27 slide on the guide surfaces 42R. The resilient latches 25 return resiliently when the disengaging portions 42 pass the resilient latches 25.

As described above, the locks 15 and the resilient latches 25 for holding the lever 20 at the initial position are formed at the existing parts, namely, the housing 10 and the lever 20. Therefore, it is not necessary to provide separate parts for holding the lever 20 at the initial position.

The resilient latches could deform sideways and the lever could move loosely from the initial position if the locks were to engage the resilient latches in a direction substantially normal to the projecting direction of the resilient latches. However, in this embodiment, the locks 15 engage the resilient latches 25 in a direction substantially parallel (e.g. within a range of about −20° to about 20°) with the projecting direction PD of the resilient latches 25. Thus, there is no possibility that the resilient latches 25 will deform sideways (vertically in FIGS. 2 and 3), and the lever 20 is held at the initial position without moving loosely.

The locks 15 are formed at the front edge of the receptacle 11 of the housing 10. Thus, it is not necessary to provide special shapes such as notches and recesses as locks, and the housing 10 has a simple shape.

The resilient latches 25 are disengaged from the locks 15 by the disengaging portions 42 when the second connector B is fit lightly into the housing 10 and the lever 20 can rotate toward the connection position. Thus, an extra operation of disengaging the resilient latches 25 and the locks 15 is unnecessary.

Portions of the arms 21 remote from the operable portion 22 are easily deformable to widen the space between the arms 21. The reliability of a locking function by the resilient latches would be reduced if the resilient latches were at positions on the arms 21 where a deformation to widen the spacing is likely. However, in this embodiment, the resilient latches 25 are at the upper sides of the arms 21 coupled by the operable portion 22 and are unlikely to undergo the widening deformation. Thus, there is no possibility that the resilient latches 25 will disengage from the locks 15 due to the widening deformation of the arms 21. This improves the reliability of the function of holding the lever 20 at the initial position.

The invention is not limited to the above described and illustrated embodiment. For example, the following embodiments are also embraced by the technical scope of the present invention as defined in the claims. Beside the following embodiments, various changes can be made without departing from the scope and spirit of the present invention as defined in the claims.

The locks are formed at the opening edge of the receptacle in the foregoing embodiment. However, the locks may be at positions different from the opening edge of the receptacle according to the present invention.

The existing shape of the housing is used partly to form the locks in the foregoing embodiment. However, special parts, such as notches or recesses, may be formed as the locks according to the present invention.

The second connector is provided with the disengaging portions to disengage the resilient latches and the locks automatically and to free the lever as the second connector is fit lightly in the foregoing embodiment. However, the resilient latches and the locks may be disengaged to free the lever by a separate operation after the second connector has been fit lightly.

The resilient latches are spaced from the center of rotation of the lever toward the operable portion in the foregoing embodiment. However, they may be provided at positions opposite from the operable portion with the center of rotation therebetween provided that the arms are sufficiently rigid so as not to be deformed to widen the spacing.

The resilient latches are provided at the left and right arms in the foregoing embodiment. However, a resilient latch may be provided only at one of the left and right arms.

The disengaging portions of the second connector contact the resilient latches in a direction substantially opposite from the projecting direction of the resilient latches in the foregoing embodiment. However, the projecting direction of the resilient latches may be reversed so that the disengaging portions contact the resilient latches in the substantially same direction as the projecting direction.

The resilient latches and the locks engage in a direction oblique to the rotating direction RD of the lever in the foregoing embodiment. However, they may be engaged in the substantially same direction as the rotating direction RD of the lever according to the present invention.

What is claimed is:

1. A lever-type connector for connection with a mating connector, comprising:

a housing having a receptacle with a front opening edge and configured for receiving the mating connector along a fitting direction;

a lever supported on the housing for rotation between an initial position and a connection position;

cam means formed at least partly on the lever for pulling the mating connector into the receptacle when the lever is rotated from the initial position to the connecting position; and a resilient latch cantilevered on the lever and extending substantially parallel to the fitting direction when the lever is at the initial position, the resilient latch having a base end unitary with the lever at a location rearward of the front opening edge of the receptacle when the lever is at the initial position, the latch further having a locking projection forward of the front opening edge of the receptacle when the receptacle is at the initial position, the locking projection having a locking surface configured for releasably engaging a portion of the front opening edge of the receptacle for releasably holding the lever at the initial position, the locking projection further having a guide surface forward of the locking surface and configured for engagement by the mating connector during an early stage of connection for urging the locking surface out of engagement with the front opening edge of the receptacle so that the lever can be rotated.

2. The lever-type connector of claim 1, wherein portions of the front opening edge engaged by the resilient latch are aligned substantially normal to the fitting direction.

3. The lever-type connector of claim 2, wherein the lever has a front edge aligned substantially parallel to the front opening edge of the receptacle when the lever is at the initial position.

4. The lever-type connector of claim 1, wherein the lever has two arms coupled by an operable portion, the resilient latch being formed at a position on at least one of the arms between a center of rotation of the lever and the operable portion.

5. The lever-type connector of claim 4, wherein each of said arms has a resilient latch.

6. The lever-type connector of claim 1, wherein the locking surface is substantially parallel to an axis of rotation of the lever.

7. A lever-type connector assembly, comprising:
   a first housing having a receptacle with a front opening edge;
   a second housing configured for insertion into the receptacle along a fitting direction;
   a lever supported on the first housing for rotation between an initial position and a connection position;
   cam means formed on the lever and on the second housing for pulling the second housing into the receptacle when the lever is rotated from the initial position to the connecting position; and
   a resilient latch cantilevered on the lever and extending substantially parallel to the fitting direction from a position rearward of the front opening edge of the receptacle to a position forward of the front opening edge of the receptacle when the lever is at the initial position, the resilient latch having a locking projection forward of the front opening edge of the receptacle when the lever is in the initial position, the locking projection having a locking surface configured for releasably engaging a portion of the front opening edge of the receptacle for releasably holding the lever at the initial position, the locking projection further having a guide surface forward of the locking surface and configured for engagement by the second housing when the second housing is inserted into the receptacle, such that the second housing deflects the resilient latch away from the front opening edge of the receptacle to permit the lever to be rotated towards the connection position.

8. The lever-type connector assembly of claim 7, wherein the second housing comprises a disengaging portion for contacting the resilient latch to disengage the resilient latch from the front edge as the second housing is fit lightly into the receptacle.

9. The lever-type connector assembly of claim 8, wherein the first housing comprises a disengagement-portion insertion groove for permitting the insertion of the disengaging portion.

10. The lever-type connector assembly of claim 8, wherein the lever has two arms coupled by an operable portion, the resilient latch being formed at a position on at least one of the arms between a center of rotation of the lever and the operable portion.

11. The lever-type connector assembly of claim 10, wherein each of said arms has a resilient latch.

12. The lever-type connector of claim 1, wherein the lever further includes an reinforcement forward of the resilient latch for preventing inadvertent deformation of the resilient latch.

13. The lever-type connector of claim 7, wherein the lever further includes an reinforcement forward of the resilient latch for preventing inadvertent deformation of the resilient latch.

* * * * *